United States Patent [19]
Griffiths

[11] 3,712,536
[45] Jan. 23, 1973

[54] MEAN-RATE INDICATING APPARATUS

[75] Inventor: John Michael Griffiths, Hillingdon, England

[73] Assignee: The Post Office, London, England

[22] Filed: March 23, 1971

[21] Appl. No.: 118,042

[30] Foreign Application Priority Data

March 12, 1970 Great Britain..................11,961/70

[52] U.S. Cl..............................235/152, 235/151.3
[51] Int. Cl..............................................G06f 7/38
[58] Field of Search .235/152; 328/134; 340/146.1 A

[56] References Cited

UNITED STATES PATENTS

| | | | |
|---|---|---|---|
| 3,341,695 | 9/1967 | Vincent et al. | 235/152 |
| 3,260,799 | 7/1966 | Simpson et al. | 340/146.1 A X |
| 3,312,813 | 4/1967 | Vincent et al. | 235/152 |
| 3,609,326 | 9/1971 | Bagley | 235/152 |

OTHER PUBLICATIONS

R. C. White, Jr. "A Fast Digital Computer Method for Recursive Estimation of the Mean" IEEE Transactions on Computers, Sept. 1970 pp. 847–849

*Primary Examiner*—Eugene G. Botz
*Assistant Examiner*—David H. Malzahn
*Attorney*—Hall & Houghton

[57] ABSTRACT

A mean-rate indicator comprises a pulse source to add to the total stored in a recirculating shift register store at a constant rate. At each occurrence of an event-indicating signal the total is reduced to a fixed fraction (¾) of its instantaneous value, the fraction being obtained by serial arithmetic addition of shifted outputs of the register. The total is shown to be a measure of the mean-rate of occurrence of the event-indicating signal and can usefully be displayed as a logarithmic output. The logarithmic output is obtained by use of a counter having a count approximating a logarithmic function clocked at the same rate as the shift register. Particular reference is made to the indication of fractional error rate in digital transmission systems.

9 Claims, 7 Drawing Figures

FIG. I.

JOHN M. GRIFFITHS
INVENTOR

MEAN-RATE INDICATING APPARATUS

This invention relates to apparatus for indicating the mean rate of occurrence of events and has especial but not exclusive reference to the measurement of mean error rate in a digital communication system.

Prior art apparatus for providing a running mean of the rate of occurrence of events has tended to suffer from the disadvantage of not being able to respond to a wide-range of rate values. Thus the time-constant of the apparatus, essential for providing a running mean, may be too large to respond to high rate values or too small to respond to low rate values satisfactorily.

It is an object of the invention to provide a mean-rate indicating apparatus which is able to respond to a wide range of rate values.

The present invention provides apparatus for indicating the mean-rate of occurrence of an event-indicating signal, the apparatus being characterized by:

a store, operative to store a total, connected to a total-increasing circuit operative to add to the total at a substantially constant rate, a divider circuit, connected to the store, operative each time an event-indicating signal is received by the divider circuit to reduce the total to a fixed fraction of its instantaneous value, and an output circuit, connected to the store, operative to provide an output signal related to the instantaneous total representative of the mean-rate of occurrence of the event-indicating signal.

By way of example only, an exemplary embodiment will now be described with reference to the concomitant drawings wherein.

Typically the error rate in a digital data transmission system can vary between one bit in $10^3$ and one bit in $10^{10}$ and the embodiment to be described is capable of measuring mean error rates varying over this range. The errors themselves may be detected by any suitable means, for example, by using a code employing alternate mark inversion.

Figure 1:
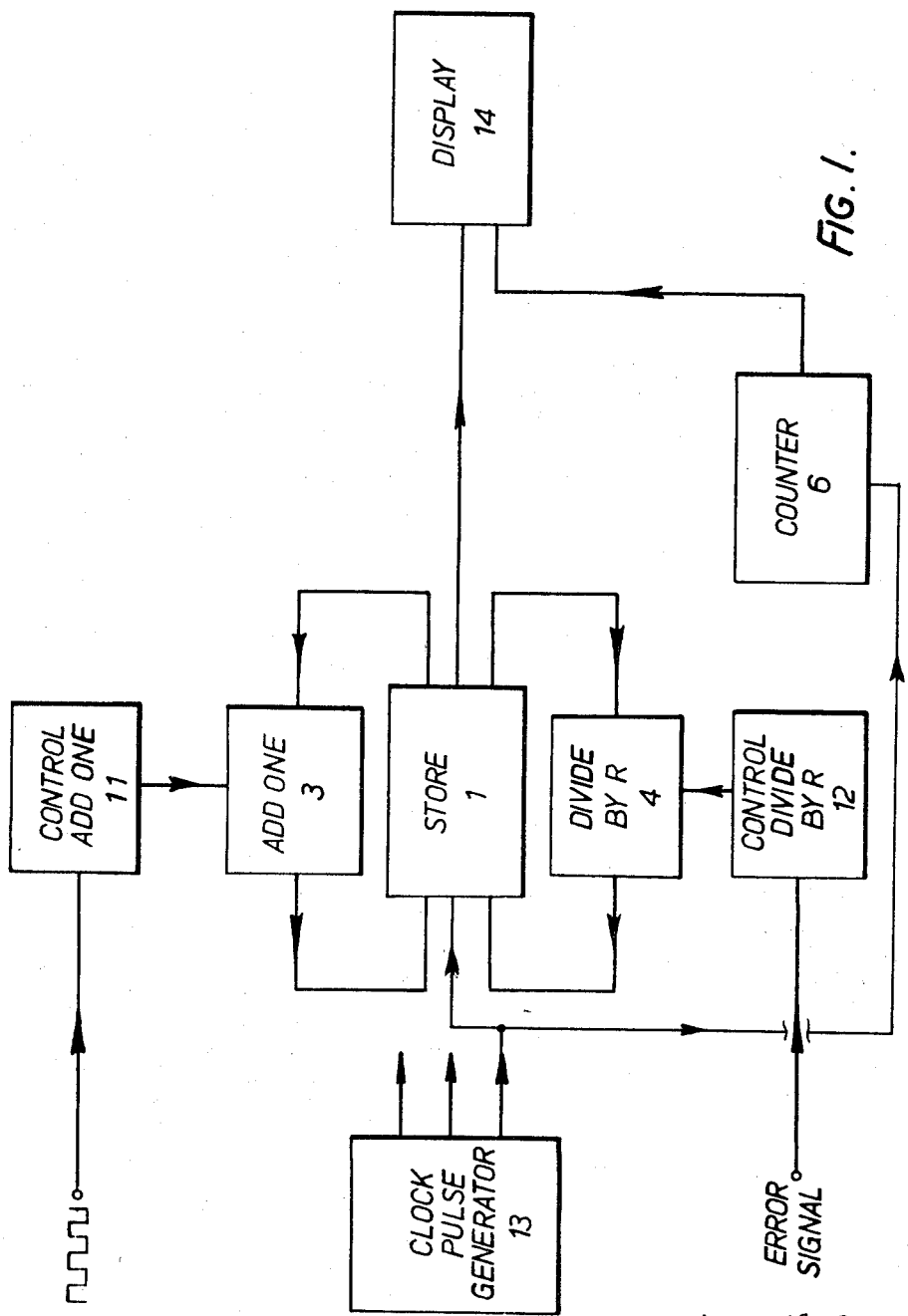
FIG. 1 shows a simplified block schematic diagram of apparatus embodying the invention for measuring the mean error-rate in a digital data transmission system.

Referring firstly to FIG. 1, the total stored in a circulating store is added to at a constant rate by an "Add One" circuit 3 under control of a "Control Add One" circuit 11 supplied with pulses at constant pulse repetition frequency. The instantaneous total stored in the store 1 is divided by a number R (greater than 1) by a "Divide-by-R" circuit 4 under control of a "Control Divide by R" circuit 12 whenever an error signal occurs. That is to say with each error signal total the stored total is reduced to $1/R$ of the value it had before the error signal occurred. The circulating store 1 is controlled by pulses from a clock pulse generator 13 and a counter 6 is also clocked at the same rate. As will be explained in more detail later, the counter 6 allows the stored total representing the mean error rate to be presented in a convenient form in a display unit 14.

The source of pulses connected to unit 11 produces pulses at the rate of P per second and an error signal causes the contents of the store to be divided by R, ($R > 1$). If there are N errors per second then, in the steady state, the count will oscillate between minimum and maximum values L (lower) and U (upper) respectively and the following equations will hold:

$$L = U/R \quad (1)$$

$$U = L = P/N \quad (2)$$

and a combination of these two gives $$U = PR/N(R-1) \quad (3)$$

If the error rate is increased by $\Delta$ then the next $U$ occurs earlier and is smaller, being equal to $L + (P/N + \Delta)$. $U$ will take a series of successively lower values $U_0$, $U_1, U_2, U_n, U_{n+1} \ldots$, satisfying the relation $$U_n = (U_n - 1/R) + (P/N + \Delta) \quad (4)$$

until it reaches a new steady value of (applying eqtn (3))

$$U_\infty = [PR/(N+\alpha)](R-1) \quad (5)$$

Hence from eqtns (4) and (5)

$$U_n - U_\infty = (U_n - 1/R) - [P/(N+\Delta)(R-1)]$$

$$= (U_{n-1} - U_\infty/R)$$

$$= (U_o - U_\infty/R^n)$$

$$= (U_o - U_\infty) \operatorname{Exp}(-n \cdot \log_e R) \quad (6)$$

Making the substitution $n = Nt$ to relate successive $U$'s to elapsed time, the relation becomes $$U_t - U_\infty = (U_o - U_\infty) \operatorname{Exp}(-N \cdot \log_e Rt) \quad (7)$$

It can be seen that a change in the error rate N causes the value of U (and of L) to decay (or grow) exponentially to a new steady value with a time-constant = $1/N \cdot \log_e R$. The apparatus, therefore, has a time-constant inversely proportional to the rate being measured. If R is made equal to 4/3, then the time-constant is about 3.5 errors; what this represents in time depends, of course, on the rate of occurrence of errors. Because of this automatic adjustment of time-constant to error rate the apparatus is able to respond to a very wide range of error rates.

The detailed circuitry of the apparatus will now be explained with reference to FIGS. 2 to 7.

Figure 2:
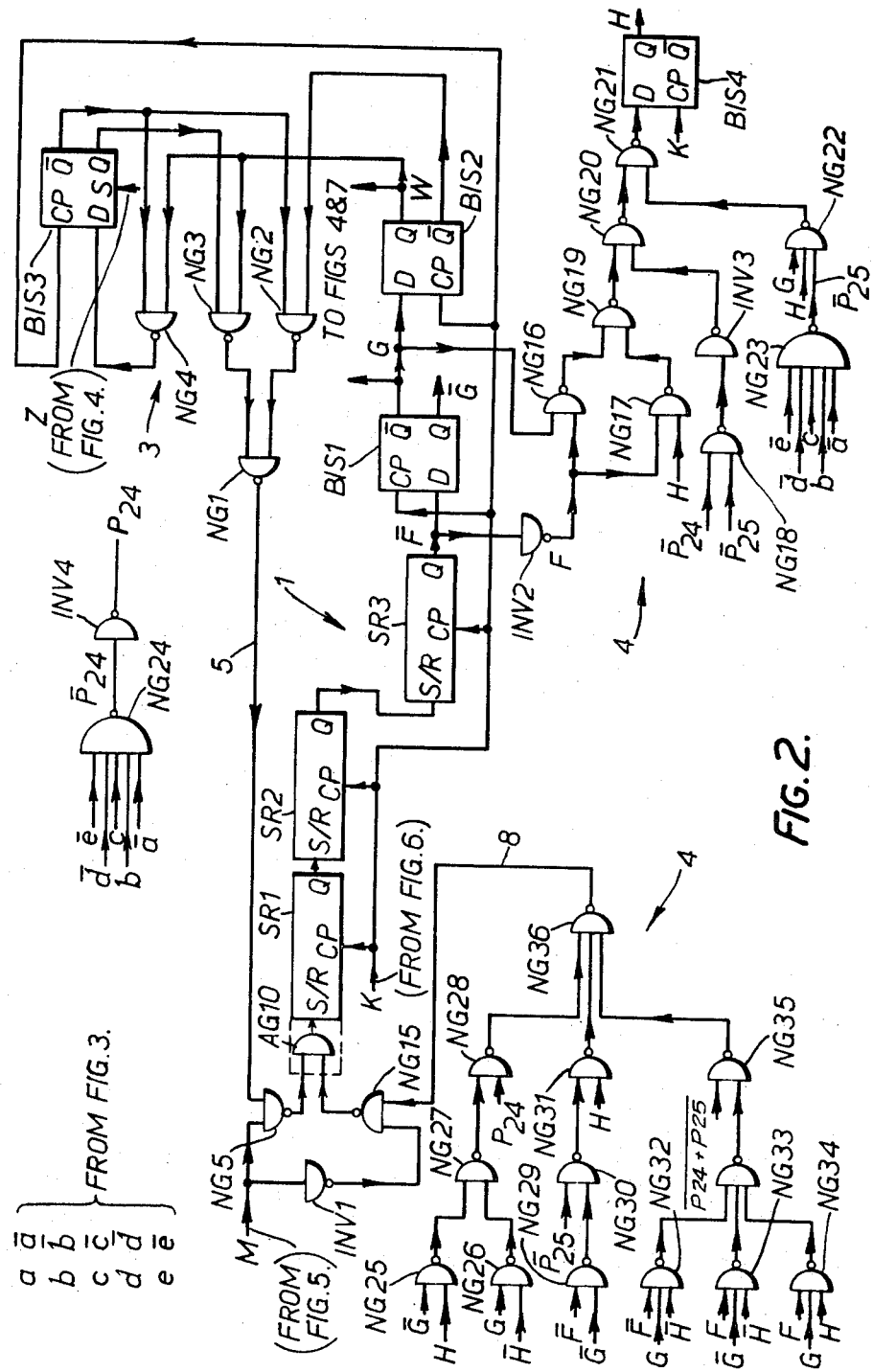
FIG. 2 shows a diagrammatic representation of the store, add one unit, and divide by R unit, of FIG. 1, in more detail.

Referring to FIG. 2, the store 1 is a 26 bit circulating store consisting of three eight-bit shift registers SR1, SR2 and SR3 and two D-type bistables BIS1 and BIS2. A timing waveform denoted K from generator 13 is applied to line 2 to shift the binary data through the store 1. The number in the store 1 is recirculated via either the Add-One Circuit 3 or a Divide-by-4/3 Circuit 4, the choice of path depending on the value of a signal M whose origin and significance will be explained in detail later.

Figure 3:
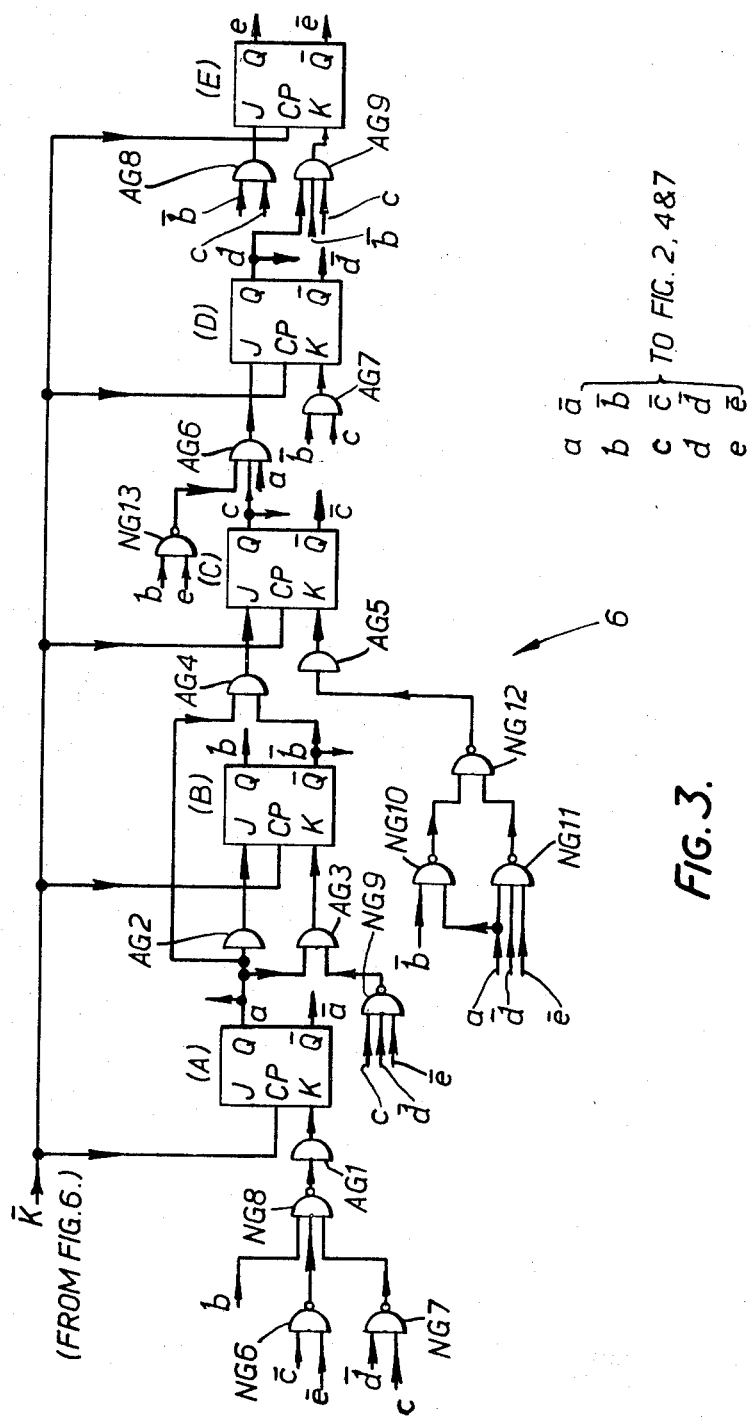
FIG. 3 shows a diagrammatic representation of the counter of FIG. 1, in more detail.

Referring now to FIG. 3, the 26 state counter, indicated generally at 6, comprises five JK bistables designated A, B, C, D, E whose Q-outputs are designated $a, b, c, d, e$ respectively; and AND-gates AG1 – AG9 and NAND-gates NG6 – NG13. The outputs of the bistables A–E are fed back to their inputs through an arrangement of logic gates so that successive occurrences of a signal $\overline{K}$ (the complement of the signal K) cause the counter to pass cyclically through a set of 26 states in the sequence set out in Table 1.

TABLE 1

| State | edc ba | Corresponds to | Displayed As |
|---|---|---|---|
| $P_0$ | 010 | 3.0 | 3.110 |
| $P_1$ | 010 11 | 3.3 | 3.4 |
| $P_2$ | 010 00 | 3.6 | 3.6 |
| $P_3$ | 010 01 | 3.9 | 3.8 |
| $P_4$ | 011 10 | 4.2 | 4.1 |
| $P_5$ | 011 11 | 4.5 | 4.4 |
| $P_6$ | 011 01 | 4.8 | 4.8 |
| $P_7$ | 100 10 | 5.1 | 5.1 |
| $P_8$ | 100 11 | 5.4 | 5.4 |
| P-hd 9 | 100 01 | 5.7 | 5.8 |
| $P_{10}$ | 101 10 | 6.0 | 6.1 |
| $P_{11}$ | 101 11 | 6.3 | 6.4 |
| $P_{12}$ | 101 00 | 6.6 | 6.6 |
| P-hd 13 | 101 01 | 6.9 | 6.8 |
| $P_{14}$ | 110 10 | 7.2 | 7.1 |
| $P_{15}$ | 110 11 | 7.5 | 7.4 |
| $P_{16}$ | 110 01 | 7.8 | 7.8 |
| $P_{17}$ | 111 10 | 8.1 | 8.1 |
| $P_{18}$ | 111 11 | 8.4 | 8.4 |
| $P_{19}$ | 111 01 | 8.7 | 8.8 |
| $P_{20}$ | 000 10 | 9.0 | 9.1 |
| $P_{21}$ | 000 11 | 9.3 | 9.4 |
| $P_{22}$ | 000 00 | 9.6 | 9.6 |
| $P_{23}$ | 000 01 | 0.9 | 9.8 |
| $P_{24}$ | 001 10 | 10.2 | 10.1 |
| $P_{25}$ | 001 11 | 10.5 | 10.4 |

The method by which the counter 6 is caused to go from state $P_0$ to $P_1$ by the occurrence of the signal $\overline{K}$ will be explained, the derivation of the other states being similar. In considering FIG. 3 it should be noted that AND-gates AG1, AG2 and AG5 are to be considered as having one input (not shown) tied to logical one so that they act as straight-through paths while the J-input of bistable A is also to be considered tied to logical one.

Table II sets out in the first three columns the J and K inputs of the bistables A, B, C, D, E as functions of their outputs. In the fourth column the bistable outputs corresponding to state $P_0$ are shown and in the next two columns the values of the J, K inputs at state $P_0$ (derived by substituting the values of column (4) in column (2) and (3)). The values of the bistable outputs at state $P_1$ may then be deduced as shown in column (7) which is in agreement with Table I.

TABLE II

| Bistable | J1/P | K2/P | O/P($P_0$) | J2/p($P_0$) | K1/P($P_0$) | O/P($P_1$) |
|---|---|---|---|---|---|---|
| A | 1 | $b + \bar{c}\cdot\bar{e} + c\cdot d$ | 0 | 1 | 1 | 1 |
| B | $a$ | $a\cdot(\bar{c}+d+e)$ | 1 | 0 | 0 | 1 |
| C | $a, \bar{b}$ | $a\cdot\bar{b}+a\cdot\bar{e}\cdot d$ | 0 | 0 | 0 | 0 |
| D | $a\cdot c\cdot(\overline{be})$ | $\bar{b}\cdot c$ | 1 | 0 | 0 | 1 |
| E | $\bar{b}\cdot c$ | $b\cdot c\cdot d\cdot$ | 0 | 0 | 0 | 0 |

The store 1 and counter 6 are stepped at the same rate, the state $P_0$ of the counter 6 corresponding to the initial state of the circulating store 1 i.e., when the least significant digit of the number stored is in bistable BIS2.

Referring again to FIG. 2, the number in the store 1 is stored as a logical complement except for the least significant digit which is stored in erect form. It will be noted that the bistables BIS1 and BIS2 are drawn in FIG. 2 in such a way that the erect form of the number is available at the upper output of the bistables in each case ($\overline{Q}$-output for BIS1 and Q-output for BIS2).

The add-one circuit 3 comprises a bistable element BIS3 and four NAND-gates NG1 - NG4. Bistable BIS3 has a reset input S which receives a signal Z; when Z; = 0 the Q output of BIS 3 is reset to zero, which causes a one to be added to the number in the store 1. The conditions under which Z = 0 are set out below in connection with FIG. 4.

The output of NG1 may be described in terms of the outputs of BIS2 and BIS3 by the following logical equation $$NG1 = BIS3 \cdot BIS2 + \overline{BIS3}\cdot\overline{BIS2}$$

Hence Z = 0 implies $BIS3 = 0$, which implies $NG1 = \overline{BIS2}$, while the equation defining the output of NG4 is:

$$NG4 = \overline{BIS2 \cdot \overline{BIS3}} = \overline{BIS2} + BIS3$$

The signal Z = 0 is clocked by a waveform J which occurs between successive K and it ($z=0$) is also timed to occur when the least significant digit of the number in store 1 is in BIS2 (i.e. counter 6 is in state $P_0$). As shown above, its effect is to cause the complement of the least significant digit to appear at the output of NG1, which is equivalent to adding one to the number. This output is read by the next K signal which also stores the output of NG4 in BIS3. The output of NG4 will be zero (implying that the next digit in BIS2 will be inverted at NG1) if, and only if, BIS3 is zero (implying that the digit in BIS2 will be inverted) and BIS2 is one (implying that a carry is needed). Thus the number in the store 1 is incremented by one by the Add-One Circuit 3 and recirculated on line 5, at the output of NG1, in erect form.

The signal on line 5 forms one input to NG5, whose other input is the signal M which is zero or one respectively according to whether an error has occurred or not since the last cycle of the store 1. The signal M is also applied, via an inverter INV1, as one input to a NAND-gate NG15 whose other input is the output of the Divide-by 4/3 Circuit 4 on line 8. When M = 0 (implying that an error has occurred) then the output of NG5 is held at logical one while the complement of the signal on line 8 is fed via AND-gate AG10 to shift-register SR1 of store 1. When M = 1 (implying that no error has occurred), then the output of NG15 is held at logical one while the complement of the signal on line 5 is fed via AG10 to shift-register SR1.

The divide-by-4/3 Circuit comprises a bistable BIS4, inverters INV2-4 and NAND-gates NG16 – 36. This circuit is required to multiply the contents of store 1 (=S, say) by ¾. This is achieved by adding together, in serial fashion, the output of BIS1 (=S/2) and SR3 (=S/4) and recirculating the sum on line 8. The output of SR3 is passed through an inverter INV2 to produce a signal F which is the erect form of the digit sequence corresponding to S/4. The signal F is combined with a signal G, the output of BIS1, representing S/2, in NAND-gates NG16 – 23 to produce a signal which sets the bistable BIS4 to its Q=1 state if a carry digit is to be generated. The output of BIS4 is designated H. The manner in which the carry digit is generated will be made clear by observing that the following logical equation holds:

$$NG21 = \overline{(\overline{P_{24}+P_{25}})\cdot(FG+FH)+\overline{P_{25}}\cdot GH}$$

Hence a carry digit is generated when either F and G are both one or F is one and there is a carry from the previous digit position (i.e. F and H are both one), but this carry is suppressed if the state of counter 6 is either $P_{24}$ or $P_{25}$ as this would mean that the signal F represented the low order digits of the new value of S. A carry digit is also generated if G and H are both one but is suppressed if the state of counter 6 is $P_{25}$ as this would means that G represented the least significant digit of the new value of S.

The signals F, G and H are combined in the array of NAND-gates NG25 – NG36 to yield a sequence of digits representing ¾S. The manner in which this is achieved can be seen by observing that the following logical equation holds:

$$NG36 = \overline{(\overline{P_{24}+P_{25}})\cdot(FGH+F\overline{G}\overline{H}+\overline{F}G\overline{H})+H(\overline{F}\overline{G}+P_{25})+P_{24}\cdot(G\overline{H}+\overline{G}H)}$$

The first term of the logical sum shows that a 1 is produced whenever F, G, H are all 1, or F alone, or G alone is 1 provided that the counter 6 is not in state $P_{24}$ or $P_{25}$; the second term shows that a 1 is produced whenever H alone is 1 and the counter 6 is in the state $P_{25}$; the third term shows that when the counter 6 is in the state $P_{24}$ a 1 is produced when G is 1 and H is 0 or vice versa. These are the required conditions to ensure that the signal on line 8 represents the contents of store 1 divided by 4/3.

Figure 4:
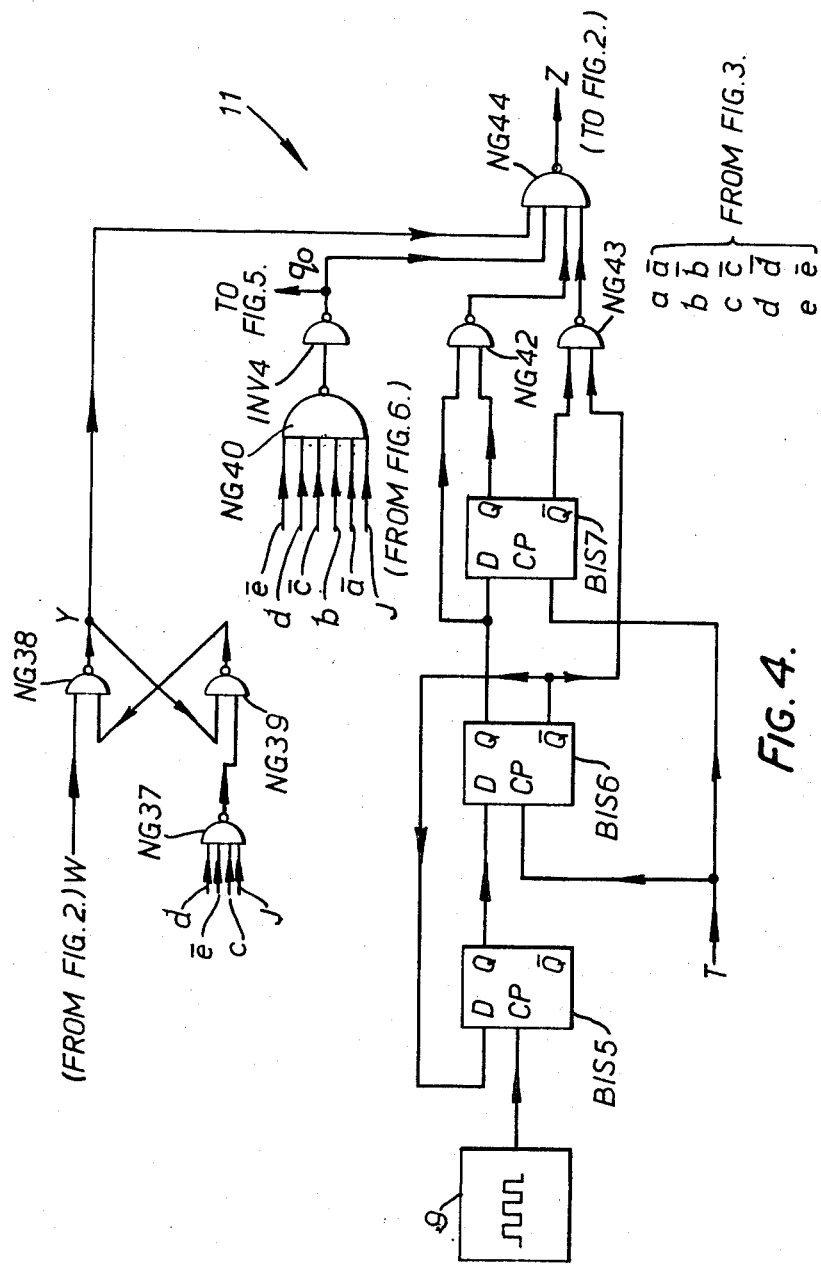
FIG. 4 shows a diagrammatic representation of the control add one unit, of FIG. 1, in more detail.

The Add-One Control Circuit illustrated in FIG. 4 comprises three bistables BIS5 – 7, inverter INV4 and NAND-gates NG37 – 40 and NG42 – 44. A source of pulses 9 at a steady p.r.f. provides a clock signal for a D-type bistable BIS5. The p.r.f. of these pulses is at least as great as the highest rate of occurrence of the events to be measured. In this embodiment, which is designed to measure digit error rates up to 1 in $10^3$ per second with a digit rate of either 1.536 MHz or 2.048MHz, the p.r.f. of the source 9 is 1.536 KHz or 2.048 KHz. The pulses from the source 9 are synchronized with the operation of the counter 6 by means of the bistables BIS5 – 7 and NAND-gates NG41 – 44. The clock input to BIS6 and BIS7, designated T, is a signal which is 1 when the counter 6 is in state $P_2$ or $P_3$. The occurrence of the signal T causes the output of BIS5 to be read into BIS6 and the output of BIS6 to be read into BIS7 while the occurrence of a pulse from source 9 causes the complement output of BIS6 to be read into BIS5. Hence if two successive T pulses occur with no pulse from source 9 intervening, then BIS6 and BIS7 take up the same state and the output of either NG42 (=$\overline{BIS6.BIS7}$) or NG43 (=$\overline{\overline{BIS6}.\overline{BIS7}}$) is zero. If, however, a pulse from source 9 intervenes the second T pulse will cause BIS6 and BIS7 to take up different states so that the outputs of both NG42 and NG43 will be 1.

The output of INV4 is a signal $q_o = P_o \cdot J$ and forms another input to NG44, $P_o = \overline{e}\cdot\overline{d}\cdot\overline{c}\cdot\overline{b}\cdot\overline{a}$.

The output of BIS2 (designated W) forms one input to a NAND-gate NG38 whose other input is the output of NG39. The outputs of NG38 forms one input to NG39 whose other input is $\overline{edcJ}$ or $\overline{(P_4+P_5+P_6)\cdot J}$.

The signal $\overline{edcJ}$ will be 0 during $P_4$, $P_5$ and $P_6$ and the respective outputs of the NAND-gates NG38 and NG39 at the end of P6 are $\overline{W}$ and 1 respectively. From $P_7$ onwards the output of NG37 is 1 and hence the external inputs to NG38 and NG39 are W and 1 respectively. If W = 1 from $P_7$ onwards, then Y (the output of NG38) will remain unchanged while if W = 0 at any time after $P_6$ then Y will be set to 1. The net result is that if all the digits of the number in store 1 signifying $2^5$ or higher-order places are 1, then Y is set to zero at time $P_o$; otherwise Y is set to one.

The signal Y forms a fourth input to NG44 so that the output of NG44 (the signal Z) is = 0 at time $P_o \cdot J$ if, and only if, an add-one pulse has been received from source 9 since the last arithmetic cycle and the count in store 1 is not excessive. The manner in which the signal Z = 0 causes the number in store 1 to be incremented by one has been explained above in connection with FIG. 1.

Figure 5:
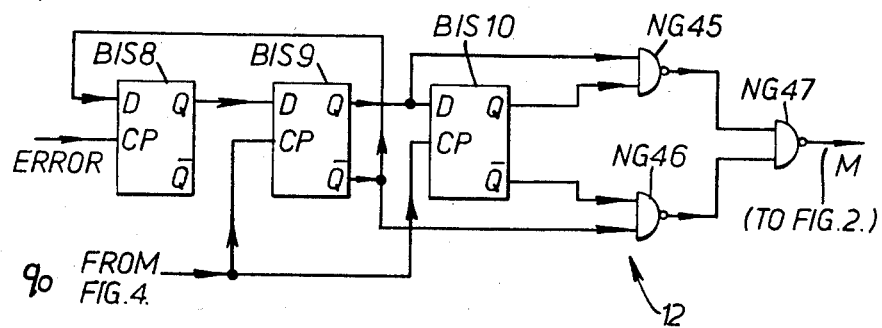
FIG. 5 shows a diagrammatic representation of the control divide by R unit of FIG. 1 in more detail.

The divide-by-4/3 Control Circuit shown in FIG. 5 comprises bistables BIS8, BIS9, BIS10 and NAND-gates NG45 – 47. The operation of this circuit is similar to that of BIS5 – 7 and NG42 – 44 of FIG. 4, the source 9 and signal T of that circuit being replaced by an input ERROR and signal $q_o$ respectively. The output of NG47, designated M, is set to zero or one by the signal $g_o$ according to whether or not an ERROR pulse has been received since the last signal $q_o$. As explained above the signal M = 0 causes the output of the divide-by-4/3 Circuit on line 8 to be input to the store 1.

Figure 6:
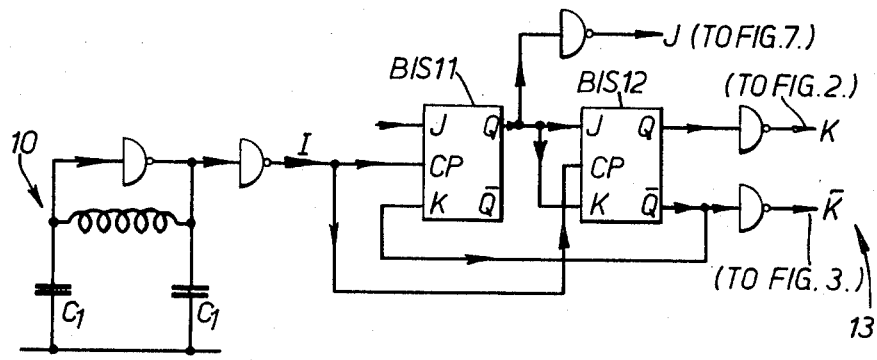
FIG. 6 shows a diagrammatic representation of the clock pulse generator of FIG. 1 in more detail.
Figure 7:
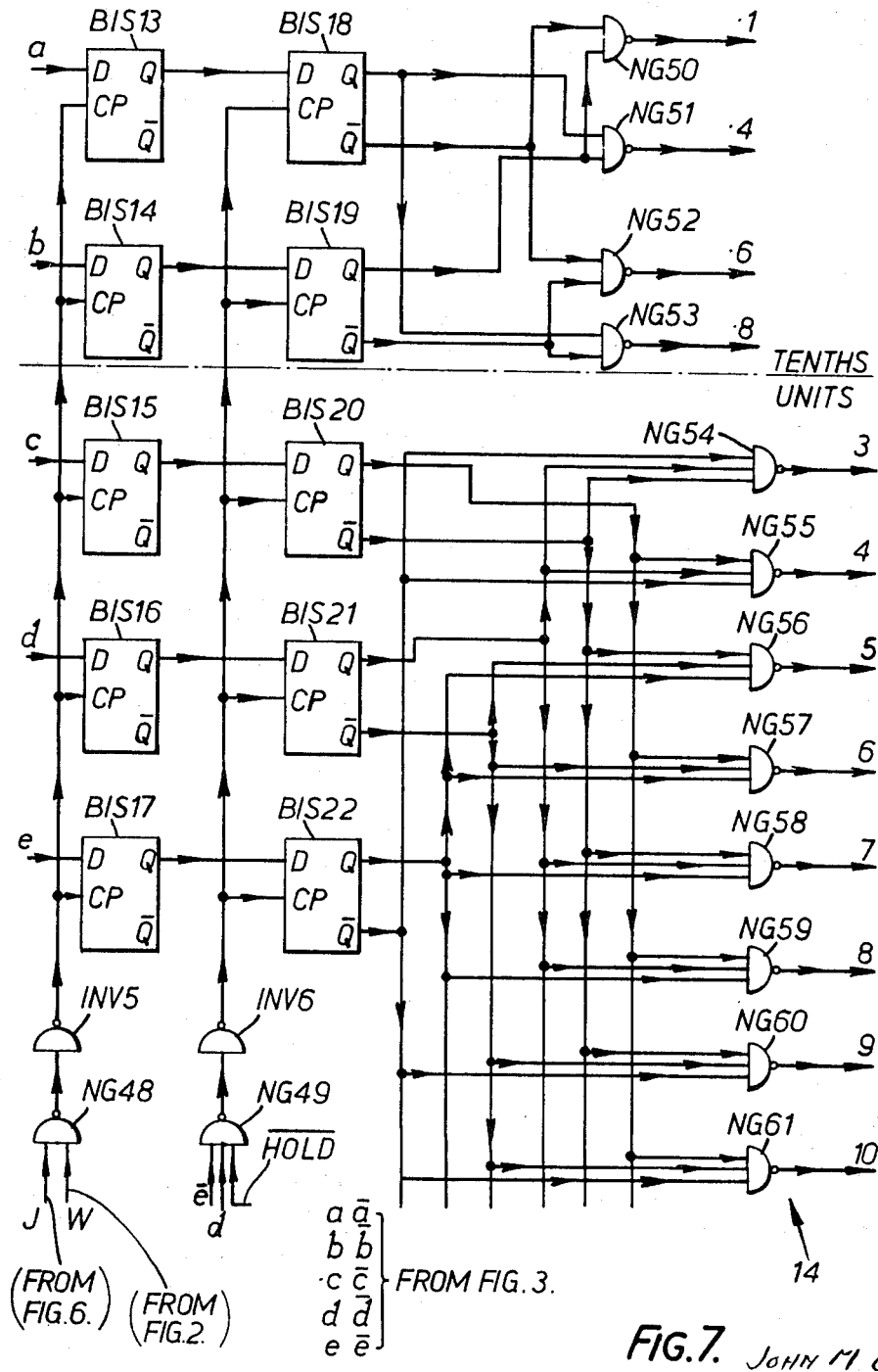
FIG. 7 shows a diagrammatic representation of the display unit of FIG. 1 in more detail.

FIG. 6 shows the generation of clock waveform J and K in a circuit comprising a 6 MHz oscillator indicated generally at 10 whose output clocks two bistables BIS11 and BIS12. The J input of BIS11 is tied to logical one while the K input is fed back from the $\overline{Q}$ output of BIS12. The J and K inputs to BIS12 are commoned and taken from the Q output of BIS11. These interconnections cause the bistables BIS11 and BIS12 to go through the sequences of states 01 ... 11 ... 10 ... 01 . .. 11 ... etc., so that the waveforms J and K (which are equal to 1 when the Q-outputs of the bistables BIS11 and BIS12, respectively are = 0) are pulse trains of 2 MHz p.r.f., 1:2 on-off ratio and staggered in phase.

As explained earlier, the number in the store 1 fluctuates (for a given steady value of error rate - N errors per second) between upper and lower limits U and L respectively. Substituting the value $R = 4/3$ in Equation (3), one obtains $$N = 4P/U$$

In considering digital transmission of information at a rate D bits per second the quantity of interest is the fractional error $N/D = 4P/UD$.

In this embodiment P (the p.r.f. of the source 9) is chosen to be equal to $D/10^3$ so that $N/D = 4/U \times 10^{-3}$.

As the fractional error varies over such a wide range it is most conveniently displayed as a negative logarithm to the base ten thus $$-\log_{10} N/D = 3 + \log_{10} U \text{ (approximately)}$$
$$= 3 = (\log_2 U \ \log_2 10)$$
$$= 3 + \tfrac{1}{3} \log_2 U \text{ (approximately)}$$

For a given value of N the fluctuation in the value of S (the number stored in store 1) is small compared to the variation arising from different values of $N$ and hence, in the above expression for $-\log_{10} N/D$, S may be substituted for $U$. The Display Unit of the embodiment, which will now be described with reference to FIG. 7 exploits this fact by producing a display of $3 + \tfrac{1}{3} \log_2 S$ (approx.) which, as explained above, is effectively a display of the fractional error rate.

The Display Unit comprises two sets of five D-type bistables BIS 13 – 17 and BIS 18 – 22, NAND-gates NG48 – NG61 and inverters INV5 – 6. The outputs $a, b, c, d, e$ of bistables A, B, C, D, E (FIG. 3) form respective D-inputs to the bistables BIS13 – 17 which receive a common clock signal = J.W. via NAND-gate NG48 and inverter INV5. The outputs of the bistables BIS13 – 17 form the inputs to bistables BIS18 – 22 which receive a common clock-signal = $\overline{e} \cdot d \cdot \overline{HOLD}$ via NG49 and INV6. The latter signal causes the outputs of BIS13 – 17 to be read into BIS18 – 22 at the commencement of the sequence of counter 6 states. As the circulating serial store 1 goes through its operating cycle the digits of the number S pass in succession, in order of increasing significance, through bistable BIS2 (FIG. 2) whose output is the signal W. It can be seen that the state of the counter 6 which is stored in BIS13 – 17 by the clock-signal J.W. indicates the most significant digit of S i.e. the highest power of two which is less than or equal to S which is a satisfactory approximation to the logarithm of S to the base 2. A display of the value of $3 + \tfrac{1}{3} \log_2 U$ could therefore be achieved by arranging a numerical display device to display a set of values ranging from 3.0 to 10.5, in steps of 0.3, corresponding to the states of bistables BIS18 – 22.

By making a further slight approximation it is possible to subdivide the display into a UNITS Display controlled by bistables BIS20 – 22 and a TENTHS Display controlled by bistables BIS18 – 19. The TENTHS Display, being controlled by two bistables, displays one of the four digits 1, 4, 6 or 8 in accordance with the $a$ and $b$ digits of the associated state of counter 6. The sequence of states of the counter 6 is so arranged that the display ranges from 3.1 upwards in steps of 0.2 or 0.4, never being more than 0.1 different from the 'true' value (See Table 1).

It will be appreciated that the embodiment described is useful in relation to measurement of mean error rate in a digital transmission system. The prior art disadvantage of a fixed time-constant apparatus is overcome and an output is provided in a very convenient form for which the circuitry required is not unduly complex.

Although the invention has been described in terms of a specific embodiment many other forms and modifications are within the scope of the invention. For example, arithmetic operations can be performed in a parallel mode apparatus instead of the serial mode described, the parallel mode would require more circuitry but would be amenable to manufacture in an integrated circuit form.

I claim:
1. Apparatus for indicating the mean rate of occurrence of an event indicating signal, the apparatus comprising:
    a store operative to store a total, a store input gate having a first and a second state, and a total increasing circuit connected to the store via the store input gate when it is in the first of said two states, operative to add to the total, so that said total increases at a substantially constant rate:
    a divider circuit connected to the store via the store input gate when it is in the second of said two states, the store input gate being switched to the second of said two states by an event indicating signal; the combination of divider circuit and store input gate operative to reduce the total in said store to a fixed fraction of its instantaneous value each time an event indicating signal is received by said store input gate:
    an output circuit, connected to the store, operative to provide an output signal related to the instantaneous total representative of the mean-rate of occurrence of the event indicating signal.
2. Apparatus as claimed in claim 1 wherein the total is stored during use in a digital form.
3. Apparatus as claimed in claim 2 wherein the fixed fraction is ¾ of the instantaneous value.
4. Apparatus as claimed in claim 2 wherein the output signal is logarithmically related to the instantaneous total.
5. Apparatus as claimed in claim 2 wherein the store comprises a shift register.
6. Apparatus as claimed in claim 5 wherein the divider circuit is operative to reduce the total to a fixed fraction of its instantaneous value by performing an arithmetic addition of parallel outputs from different stages of the shift register.
7. Apparatus as claimed in claim 5 wherein the total-increasing circuit includes a source of pulses of substantially constant pulse repetition frequency connected so that the pulses are operative to increase the total stored in the shift register.
8. Apparatus as claimed in claim 5 wherein the output circuit includes a counter circuit which during use is clocked in step with the shift register to provide a logarithmic representation of the instantaneous total as the output signal.
9. Apparatus as claimed in claim 2 wherein:
    the output signal is logarithmically related to the instantaneous total,
    the store comprises a shift register, and
    the divider circuit is operative to reduce the total to a fixed fraction of its instantaneous value by performing an arithmetic addition of parallel outputs from different stages of the shift register.

* * * * *